United States Patent [19]

Newkirk

[11] Patent Number: 4,820,498

[45] Date of Patent: Apr. 11, 1989

[54] METHOD FOR PRODUCING SUBSTANTIALLY PURE ALUMINA MATERIAL

[75] Inventor: Marc S. Newkirk, Newark, Del.

[73] Assignee: Lanxide Technology Company, LP, Newak, Del.

[21] Appl. No.: 907,934

[22] Filed: Sep. 16, 1986

[51] Int. Cl.$^4$ ............ C01F 1/00; C01F 7/00; B01D 11/00

[52] U.S. Cl. .................... 423/132; 423/412; 423/625; 264/65; 264/344; 501/94; 501/127; 501/153

[58] Field of Search ........... 423/132, 345, 412, 618, 423/625, 626; 264/233, 344, 65; 501/87, 88, 94, 96, 98, 127, 128, 134, 153

[56] References Cited

U.S. PATENT DOCUMENTS

| | | | |
|---|---|---|---|
| 228,867 | 6/1880 | Chadwick et al. | 423/132 |
| 725,683 | 4/1903 | Doremus | 423/132 |
| 1,036,453 | 8/1912 | Childs | 423/132 |
| 1,079,899 | 11/1913 | Chappell | 423/132 |
| 1,262,063 | 4/1918 | Lawrie | 423/132 |
| 1,777,570 | 10/1930 | Masin | 423/132 |
| 1,798,261 | 3/1931 | Horsfield | 423/132 |
| 2,249,761 | 7/1941 | Hixson et al. | 423/132 |
| 2,741,822 | 4/1956 | Udy | 25/157 |
| 3,255,027 | 6/1966 | Talsma | 106/65 |
| 3,296,002 | 1/1967 | Hare | 106/40 |
| 3,298,842 | 1/1967 | Seufert | 106/65 |
| 3,419,404 | 12/1968 | Mao | 106/65 |
| 3,421,863 | 1/1969 | Bawa | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,789,096 | 1/1974 | Church | 264/60 |
| 3,864,154 | 2/1975 | Gazza et al. | 29/123 B |
| 3,973,977 | 8/1976 | Wilson | 106/62 |
| 4,567,026 | 1/1986 | Lisowyj | 423/132 |
| 4,618,592 | 10/1986 | Kuramato | 501/96 |

FOREIGN PATENT DOCUMENTS

| | | |
|---|---|---|
| 0116809 | 8/1984 | European Pat. Off. |
| 0155831 | 9/1985 | European Pat. Off. |
| 0169067 | 1/1986 | European Pat. Off. |
| 339028 | 12/1930 | United Kingdom ........ 423/132 |

OTHER PUBLICATIONS

*Aluminum and Its Products*, Edwards et al., McGraw-Hill, N.Y. (1930), pp. 226–230.

"Oxidation of Molten Aluminum Alloys, Reaction with Refractories"–M. Drouzy and M. Richard–Mar. 1974–Fonderie, France, No. 332, pp. 121–128.

"Refractories for Aluminum Alloy Melting Furnaces'-'–B. Clavaud and V. Jost–Sep. 1980–Lillian Brassinga (from French), Jan. 1985.

*Primary Examiner*—William R. Dixon, Jr.
*Assistant Examiner*—Andrew Griffis
*Attorney, Agent, or Firm*—Mark G. Mortenson; William E. McShane

[57] ABSTRACT

A method for producing an alumina of high purity, which comprises forming an oxidation reaction product of an aluminum parent metal and an oxygen-containing vapor-phase oxidant, comminuting the resulting ceramic body, and leaching any non-alumina materials therefrom, and recovering said substantially pure alumina material.

15 Claims, No Drawings

4,820,498

METHOD FOR PRODUCING SUBSTANTIALLY PURE ALUMINA MATERIAL

FIELD OF INVENTION

This invention relates to a method for producing a substantially pure alumina. More particularly, this invention relates to a method for producing a substantially pure alumina derived from the comminuted and purified product of an unusual oxidation reaction process utilizing an aluminum parent metal and an oxygen-containing gas. The invention also relates to a method for upgrading the quality of a lower purity alumina to yield a high purity alumina product.

BACKGROUND AND DESCRIPTION OF COMMONLY OWNED PATENT APPLICATIONS

The following Commonly Owned Patent and Patent Applications describe novel methods for producing a self-supporting ceramic body by oxidation of a parent to form a polycrystalline material of an oxidation reaction product and, optionally, metallic constituents:

(A) U.S. Pat. No. 4,713,360, which issued on Dec. 15, 1987 from U.S. application Ser. No. 818,943, filed Jan. 15, 1986, which is a continuation-in-part of Ser. No. 776,964, filed Sept. 17, 1985, which is a continuation-in-part of Ser. No. 705,787 filed Feb. 26, 1985, which is a continuation-in-part of U.S. application Ser. No. 591,392 filed Mar. 1 6, 1984, all in the name of Marc S. Newkirk et al and entitled "Novel Ceramic Materials and Methods for Making the Same"; and (B) Ser. No. 822,999, filed Jan. 27, 1986, which is a continuation-in-part of Ser. No. 776,965, filed Sept. 17, 1985, which is a continuation-in-part of Ser. No. 747,788, filed June 25, 1985, which is a continuation-in-part of Ser. No. 632,636, filled July 20, 1984, all in the name of Marc S. Newkirk et al and entitled "Methods of Making Self-Supporting Ceramic Materials"; and (C) Ser. No. 819,397, filed Jan. 17, 1986, which is a continuation-in-part of Ser. No. 697,876, filed Feb. 4, 1985, both in the name of Marc S. Newkirk et al. and entitled "Composite Ceramic Articles and Methods of Making Same."

The entire disclosures of each of the aforesaid Commonly Owned Patent Applications and Patent are incorporated herein by reference.

As explained in these Commonly Owned Patent Applications, novel polycrystalline ceramic materials or polycrystalline ceramic composite materials are produced by the oxidation reaction between a parent metal and a vapor-phase oxidant, i.e. a vaporized or normally gaseous material, as an oixidizing atmosphere. The method is disclosed generically in the aforesaid Commonly Owned Patent . In accordance with this generic process, a parent metal, e.g. aluminum, is heated to an elevated temperature above its melting point but below the melting point of the oxidation reaction product to form a body of molten parent metal which reacts upon contact with a vapor-phase oxidant to form the oxidation reaction product. At this temperature, the oxidation reaction product, or at least a portion thereof, is in contact with and extends between the body of molten parent metal and the oxidant, and molten metal is drawn or transported through the formed oxidation reaction product and towards the oxidant. The transported molten metal forms additional oxidation reaction product upon contact with the oxidant, at the surface of previously formed oxidation reaction product. As the process continues, additional metal is transported through this formation of polycrystalline oxidation reaction product thereby continually "growing" a ceramic structure of interconnected crystallites. The resulting ceramic body may contain metallic constituents, such as non-oxidized constituents of the parent metal, and/or voids. In the case of an oxide as the oxidation reaction product, oxygen or gas mixtures containing oxygen (including air) are suitable oxidants, with air usually being preferred for obvious reasons of economy. However, oxidation is used in its broad sense in all of the Commonly Owned Patent Applications and patent and in this application, and refers to the loss or sharing of electrons by a metal to an oxidant which may be one or more elements and/or compounds.

In certain cases, the parent metal may require the presence of one or more dopants in order to favorably influence or facilitate growth of the oxidation reaction product, and the dopants are provided as alloying constituents of the parent metal. For example, in the case of aluminum as the parent metal and air as the oxidant, dopants such as magnesium and silicon, to name but two of a larger class of dopant materials, are alloyed with aluminum and utilized as the parent metal. The resulting oxidation reaction product comprises alumina, typically alpha-alumina.

The aforesaid Commonly Owned Patent Applications (B) disclose a further development based on the discovery that appropriate growth conditions as described above, for parent metals requiring dopants, can be induced by applying one or more dopant materials to the surface or surfaces of the parent metal, thus avoiding the necessity of alloying the parent metal with dopant materials, e.g. metals such as magnesium, zinc and silicon, in the case where aluminum is the parent metal and air is the oxidant. With this improvement, it is feasible to use commercially available metals and alloys which otherwise would not contain or have appropriately doped compositions. This discovery is advantageous also in that ceramic growth can be achieved in one or more selected areas of the parent metal's surface rather than indiscriminately, thereby making the process more efficiently applied, for example, by doping only one surface, or only portion(s) of a surface, of a parent metal.

Thus, the aforesaid Commonly Owned Patent Applications describe the production of alumina as an oxidation reaction product readily "grown" to relatively large sizes, which then can be a useful source for alumina products. The present invention provides a method for obtaining substantially pure alumina derived from alumina produced by the aforementioned oxidation reaction process wherein, e.g., aluminum parent metal was reacted with an oxygen-containing vapor-phase oxidant.

Novel ceramic composite structures and methods of making them are disclosed and claimed in the aforesaid Commonly Owned Patent Applications (C) which utilize the oxidation reaction to produce ceramic composite structures comprising a substantially inert filler infiltrated by the polycrystalline ceramic matrix. A parent metal positioned adjacent to a mass of permeable filler is heated to form a body of molten parent metal which is reacted with a vapor-phase oxidant, as described above, to form an oxidation reaction product. As the oxidation reaction product grows and infiltrates the adjacent filler material, molten parent metal is drawn through previously formed oxidation reaction product into the mass of filler and reacts with the oxidant to form additional oxidation reaction product at the surface of the previously formed product, as described above. The resulting growth of oxidation reaction product infiltrates or embeds the filler and results in the formation of a ceramic composite structure of a polycrystalline ceramic matrix embedding the filler. For example, in the case of employing doped aluminum as the parent metal, air as the oxidant, and alumina particles or powder as the permeable filler, a composite is formed as described above which typically consists essentially of alumina particles in an alumina matrix having various metallic constituents dispersed therethrough.

In a further aspect of the present invention, it has been discovered that in the process of growing an alumina oxidation reaction product as a matrix through an alumina filler material, that when relatively impure forms of alumina fillers are employed, particularly those containing silicates, they react with the parent aluminum metal during the process to yield purer alumina and reduced metallic constituents, such as silicon. The process therefore can provide a source of high purity alumina from a lower purity alumina source.

SUMMARY OF THE INVENTION

In one embodiment of this invention, an aluminum parent metal is heated in the presence of an oxygen-containing vapor-phase oxidant to form a body of molten aluminum metal. As molten aluminum metal contacts the oxidant, alumina is formed as the oxidation reaction product. The process conditions are maintained to progressively draw molten metal through the formed alumina oxidation reaction product and toward the oxidant so as to continuously form alumina oxidation reaction product at the interface between the oxygen-containing vapor-phase oxidant and previously formed alumina oxidation reaction product. The heating step is conducted at temperatures above the melting point of the aluminum parent metal, but below the temperature of the alumina oxidation reaction product. The heating is continued for such time as is necessary to produce an alumina polycrystalline ceramic body. The body may include one or more non-alumina metallic materials such as nonoxidized parent metal, dopants, or both.

This invention is based on the discovery that substantially all of the non-alumina materials present in the polycrystalline ceramic product produced as discussed above are (a) after comminuting of the ceramic product, are accessible from the surfaces of the comminuted ceramic product and (b) are primarily metallic rather than ceramic. The non-alumina materials (e.g., primarily metallic materials) can then be extracted, dissolved or dispersed from the ceramic body by one or more leachants, whether gas or liquid, hereinafter referred to as "leaching agents" and "leaching." A series of leaching stages may be desirable, with typically utilization of a water wash between each leaching step or stage.

The polycrystalline material thus obtained is ground, pulverized, or the like to a suitable particle size, or range of particle sizes. The resulting material is then contacted with one or more leachants, or a series of leachants, such as acids, bases, or other useful solvents, depending on the impurity, whereby non-alumina materials such as unoxidized aluminum metal, alloy constituents of the parent metal, metals derived from dopants, or combinations of each, are removed from the alumina material. This leaching process is continued for a time sufficient to remove the aforesaid non-alumina materials from the comminuted polycrystalline product so that an alumina material having a purity of not less than 99.9% by weight alumina can be recovered, and more preferably 99.99% or purer.

A feature which has been discovered concerning the aluminas produced by the method of the present invention is that these aluminas have extremely clean grain boundaries with no impurities present. This factor results in a property of intragranular fracture in the materials, a feature frequently absent in many traditionally-produced aluminas. Such property in aluminas has been linked to superior performance in certain applications such as abrasives and polishing media.

In another aspect of the present invention, a means of forming high purity alumina is provided not only by the oxidation reaction of parent aluminum metal but by the upgrading of a lower grade alumina particulate product by simultaneous aluminothermic reduction of other oxide impurities in such product during the oxidation growth process. In this case, an aluminum parent metal is positioned or oriented relative to a permeable mass of alumina-based filler material in the presence of an oxidant (typically air), so that formation of the oxidation reaction product will occur in a direction towards and into the mass of filler. Such growth of oxidation reaction product infiltrates or embeds the mass of filler thereby forming an alumina/metallic composite ceramic structure. The alumina-based filler may be a loose or bonded array characterized by interstices, openings or intervening spaces, and the bed or mass is permeable to the vapor-phase oxidant and to the growth of oxidation reaction product. As used herein and in the appended claims, "filler" or "filler material" is intended to mean either a homogeneous alumina-based composition or a heterogeneous alumina-based composition comprised of two or more materials.

The oxidation reaction product grows into the filler, without disruption or displacement of the filler constituents, thereby forming an alumina/metallic composite. Oxide impurities in the alumina-based filler are reduced by aluminothermic reduction to yield purer alumina constituents and residual metallic constituents. The resulting alumina/metallic composite is then crushed or otherwise comminuted and its residual metallic impurties are removed by leaching with leachants, thereby yielding a high purity alumina particulate product.

In this specification and the appended claims the following terms have the following meaning:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents derived from the aluminum parent metal, or reduced from the dopant or the filler, most typically within the range of from about 1–40% by volume, but may include still more metal.

"Oxidation reaction product" means one or more metals in any oxidized state wherein the metal(s) have given up electrons to or shared electrons with another element, compound, or combination thereof. Accordingly, an "oxidation reaction product" under this definition includes the product of the reaction of aluminum parent metal with oxygen.

"Oxidant", "vapor-phase oxidant" or the like, which identifies the oxidant as containing or comprising a particular gas or vapor, means an oxidant in which the identified gas or vapor is the sole, or predominant, or at least a significant oxidizer of the parent metal under the conditions obtained in the oxidizing environment utilized. For example, although the major constituent of air is nitrogen, the oxygen content of air is the sole oxidizer for the parent metal because oxygen is a significantly stronger oxidant than nitrogen. Air therefore falls within the definition of an "oxygen-containing gas" oxidant.

"Parent metal" refers to that metal, i.e. aluminum, which is the precursor for the polycrystalline oxidation reaction product, and includes that metal as a relatively pure metal, a commercially available metal with impurities and/or alloying constituents, or an alloy in which that metal precursor is the major constituent; and when aluminum metal is mentioned as the parent metal, the metal should be read with this definition in mind unless indicated otherwise by the context.

DETAILED DESCRIPTION OF THE INVENTION AND PREFERRED EMBODIMENTS

In accordance with one aspect of the present invention, the aluminun parent metal (which typically is doped, as explained below in greater detail) as the precursor to the alumina oxidation reaction product, is formed into an ingot, billet, rod, plate, or the like, and placed in an inert bed, crucible or other refractory container. This container with its contents is placed in a furnace which is supplied with an oxygen-containing vapor-phase oxidant. This setup is heated to temperatures below the melting point of the alumina oxidation reaction product but above the melting point of the aluminum parent metal, which temperatures are generally between about 850°–1450° C., and more preferably between about 900°–1350° C. Within this operable temperature interval or range, a body or pool of molten metal forms, and on contact with the oxygen-containing vapor-phase oxidant, the molten aluminum metal will react to form a layer of alumina oxidation reaction product. In certain cases, however, wherein a dopant material such as magnesium is used in conjunction with the aluminum parent metal, the formation of the alumina oxidation reaction product may be preceded by the formation of a thin spinel layer such as magnesium aluminate spinel (as discussed below in greater detail). Upon continued exposure to the oxidizing environment, molten metal is progressively drawn into and through any previously formed oxidation reaction product in the direction of the vapor-phase oxidant. On contact with the oxidant, the molten aluminum metal will react to form additional alumina oxidation reaction product, and thus form a progressively thicker body of alumina oxidation reaction product while leaving residual metallic constituents dispersed through the alumina polycrystalline material. The reaction of the molten aluminum metal with the oxygen-containing vapor-phase oxidant is continued until the alumina oxidation reaction product has grown to a desired limit or boundary, and desirably is continued for a time sufficient to react all or substantially all of the aluminum parent metal with the oxygen-containing vapor-phase oxidant. The resulting alumina ceramic body is comminuted to a desired particule size by conventional techniques such as impact milling, roller milling, gyratory crushing or the like.

As explained above, the ceramic product formed may contain metallic components such as nonoxidized aluminum parent metal, alloying constituents of the parent metal or dopant materials. The amount of metal can vary over a wide range of 1 to 40 percent by volume, and sometimes higher, depending largely upon the degree of exhaustion (conversion) of aluminum parent metal used in the process and/or the identity and amount of dopant or dopants employed. Typically, it is desirable to react substantially all of the aluminum parent metal with the oxygen-containing vapor-phase oxidant in order to minimize the amount of aluminum parent metal which has to be subsequently removed in the solvent extraction step. Additionally, the oxidation reaction product is usually more easily fractured than the metal constituents, which therefore may remain as larger particles. Thus, limiting the amount of metal included in the ceramic body minimizes or mitigates the work required in comminuting the ceramic body and in the solvent extraction operation. In some cases, it may be desirable to first physically separate the larger particles of metal from the oxidation reaction product as by screening prior to the extraction step in order to mitigate the processing necessary in this operation.

The comminuted oxidation reaction product is then contacted with one or more appropriate leachants or series of leachants, to remove, dissolve, disperse or the like non-alumina materials, resulting from the formation of the ceramic body, from the alumina. A leachant may comprise an acid, mixture of acids, base or alkali, mixture of bases, or other solvent, which is suitable to dissolve or remove the particular non-alumina material, such as aluminum metal or dopant metal, without substantially degrading the alumina product. A leachant may comprise a liquid such as an acid solution, a gas or vapor such as chlorine gas, or other fluid mediums such as supercritical solvent systems. Additionally, more than one leachant may be used in series in order to remove various non-alumina materials which each can be more easily and/or efficiently removed with a particular leachant which is not suitable, or as suitable, for removal of other non-alumina materials present. For example, the comminuted polycrystalline ceramic product containing unreacted aluminum and silicon as a dopant in the oxidation reaction process first may be contacted with an acid leachant to remove certain metals (e.g. aluminum), water-washed, then contacted with a caustic leachant to remove other metals (e.g. silicon), water-washed again, and a relatively pure alumina is recovered. Additionally, in accordance with the present invention, the comminuting and leaching sequence may be repeated one or more times with the same polycrystalline product to obtain an alumina material having a higher purity.

A leachant, or series of leachants, is chosen primarily for its ability to dissolve or remove one or several of the particular non-alumina materials (herein sometimes referred to as "residual metal" or "residual metallic contituents") present in the comminuted polycrystalline ceramic product. Most typically, those non-alumina materials comprise non-reacted (i.e., non-oxidized) portions of the aluminum parent metal, alloy impurities from the parent metal, dopant metal or metals resulting from the reduction of dopant materials (e.g. Si from $SiO_2$). Therefore, a leachant or series of leachants must be chosen with the particular non-alumina materials in mind. For example, unreacted aluminum metal present in the oxidation reaction product can be effectively removed with an acid such as 50% HCl. To hasten the process or improve the efficiency of the same, the leaching setup, comprising the comminuted polycrystalline ceramic product contacted with the particular leachant, may be agitated and/or heated. In addition to unoxidized aluminum, the comminuted oxidation reaction product typically contains one or more metals resulting from the dopant materials. In some cases, for example, when silicon or a silicon-containing dopant is employed, an acid medium may not satisfactorily remove the non-alumina metal (e.g. silicon). Therefore, a second leachant such as an alkali (e.g. caustic soda solution) will be necessary to remove those materials. However, care should be taken when employing a series of separate leachants to avoid mixture or combination of leachants which may be hazardous or defeat the designed effectiveness of the leaching, which may be avoided, for example, by a suitable purge such as a solvent wash (e.g. deionized water). The polycrystalline ceramic product is contacted with the leachant, or series of leachants, for a time sufficient to dissolve away or otherwise remove substantially all of the non-alumina materials. Thus, the alumina material is recovered having a purity of typically not less than 99.9% by weight alumina, and preferably 99.99%.

As explained in the Commonly Owned Patent and Patent Applications, the addition of dopant materials, in conjunction with the aluminum parent metal, can favorably influence the oxidation reaction process. The function or functions of the dopant material can depend upon a number of factors other than the dopant material itself. These factors include, for example, the end product desired, the particular combination of dopants when two or more dopants are used, the use of an externally applied dopant in combination with an alloyed dopant, the concentration of the dopant, the oxidizing environment, and the process conditions.

The dopant or dopants used in conjunction with the aluminum parent metal (1) may be provided as alloying constituents of the aluminum parent metal, or (2) may be applied to at least a portion of the surface of the aluminum parent metal, or any combination of techniques (1) and (2) may be employed. For example, an alloyed dopant may be used in combination with an externally applied dopant. A source of the dopant may be provided by placing a rigid body of dopant in contact with at least a portion of the aluminum parent metal surface. For example, a thin sheet of silicon-containing glass can be placed upon a surface of the aluminum parent metal. When the aluminum parent metal (which may be internally doped with Mg) overlaid with the silicon-containing material is melted in an oxidizing environment (e.g., in the case of aluminum in air, between about 850° C. to about 1450° C., preferably about 900° C. to about 1350° C.), growth of the polycrystalline ceramic material occurs. In the case where the dopant is externally applied to at least a portion of the surface of the aluminum parent metal, the polycrystalline aluminum oxide structure generally grows substantially beyond the dopant layer (i.e., to beyond the depth of the applied dopant layer). In any case, one or more of the dopants may be externally applied to the parent metal surface. Additionally, any concentration deficiencies of the dopants alloyed within the parent metal may be augmented by additional concentration of the respective dopant(s) applied external to the aluminum parent metal.

Useful dopants for an aluminum parent metal, particularly with air as the oxidant, include, for example, magnesium metal and zinc metal, in combination with each other or in combination with other dopants described below. These metals, or a suitable source of the metals, may be alloyed into the aluminum-based parent metal at concentrations for each of between about 0.1-10% by weight based on the total weight of the resulting doped metal. Concentrations within this range appear to initiate the ceramic growth, enhance metal transport and favorably influence the growth morphology of the resulting oxidation reaction product. The concentration range for any one dopant will depend on such factors as the combination of dopants and the process temperature.

Other dopants which are effective in promoting alumina polycrystalline oxidation reaction product growth, from aluminum parent metal systems are, for example, silicon, germanium, tin and lead, especially when used in combination with magnesium. One or more of these other dopants, or a suitable source of them, is alloyed into the aluminum parent metal system at concentrations for each of from about 0.5 to about 15% by weight of the total alloy; however, more desirable growth kinetics and growth morphology are obtained with dopant concentrations in the range of from about 1-10% by weight of the total parent metal alloy. Lead as a dopant is generally alloyed into the aluminum-based parent metal at a temperature of at least 1000° C. so as to make allowances for its low solubility if aluminum; however, the addition of other alloying components, such as tin, will generally increase the solubility of lead and allow the alloying materials to be added at a lower temperature.

One or more dopants may be used in conjunction with the parent metal. For example, in the case of an aluminum parent metal and with air as the oxidant, particularly useful combinations of dopants include (a) magnesium and silicon or (b) magnesium, zinc and silicon. In such examples, a preferred magnesium concentration falls within the range of from about 0.1 to about 3% by weight, for zinc in the range of from about 1 to about 6% by weight, and for silicon in the range of from about 1 to about 10% by weight.

Additional examples of dopant materials, useful with an aluminum parent metal, include sodium and lithium, which may be used individually or in combination with one or more other dopants depending on the process conditions. Sodium and lithium may be be used in very small amounts in the parts per million range, typically about 100-200 parts per million, and each may be used alone or together, or in combination with other dopant(s). Calcium, boron, phosphorus, yttrium, and rare earth elements such as cerium, lanthanum, praseodymium, neodymium and samarium are also useful dopants, and herein again especially when used in combination with other dopants.

The dopant materials when used externally are usually applied to a portion of a surface of the parent metal as a uniform coating thereon. The quantity of dopant is effective over a wide range relative to the amount of parent metal to which it is applied and, in the case of aluminum, experiments have failed to identify either upper or lower operable limits. For example, when utilizing silicon in the form of silicon dioxide externally applied as the dopant for an aluminum-based parent metal using air or oxygen as the oxidant, quantities as low as 0.00003 gram of silicon per gram of parent metal, or about 0.0001 gram of silicon per square centimeter of exposed parent metal surface, together with a second dopant having a source of magnesium and/or zinc produce the polycrystalline ceramic growth phenomenon. It also has been found that a ceramic structure is achievable from an aluminum-based parent metal using air or oxygen as the oxidant by using MgO as the dopant in an amount greater than about 0.0008 gram of Mg per gram of parent metal to be oxidized and greater than 0.003 gram of Mg per square centimeter of parent metal surface upon which the MgO is applied. It appears that to some degree an increase in the quantity of dopant materials will decrease the reaction time necessary to produce the ceramic composite, but this will depend upon such factors as type of dopant, the parent metal and the reaction conditions. However, increasing the amount of dopant material employed typically results in increased processing time in the leaching step to remove the included dopant material.

Where the parent metal is aluminum internally doped with magnesium and the oxidizing medium is air or oxygen, it has been observed that magnesium is at least partially oxidized out of the alloy at temperatures of from about 820° to 950° C. In such instances of magnesium-doped systems, the magnesium forms a magnesium oxide and/or magnesium aluminate spinel phase at the surface of the molten aluminum alloy and during the growth process such magnesium compounds remain primarily at the initial oxide surface of the parent metal alloy (i.e., the "initiation surface") in the growing ceramic structure. Thus, in such magnesium-doped systems, an aluminum oxide-based structure is produced apart from the relatively thin layer of magnesium aluminate spinel at the intitiation surface. Where desired, this initiation surface can be readily removed as by grinding, machining, polishing or grit blasting prior to comminuting the polycrystalline ceramic product.

In accordance with the present invention, a ceramic body is fabricated as per the method disclosed in the Commonly Owned Patent, referred to above, using a 10% silicon, 3% magnesium-containing aluminum alloy, heated in air at 1200° C. The resulting ceramic body is comminuted to approximately minus 500 mesh particle size. The comminuted oxidation reaction product is contacted with a 50% hydrochloric acid/deionized water solution for 24 hours while agitating. The material is elutriated with deionized water, and subsequently contacted with 50% sodium hydroxide/deionized water solution for 24 hours. The material is then elutriated several times with deionized water for 24 hours, and the resulting high purity alumina material is recovered.

In another aspect of the present invention, a body or mass of alumina-based filler material is placed in an oxygen-containing environment adjacent to any aluminum parent metal source with appropriate dopants as described above, so as to be presented in the path of the subsequently developing oxidation reaction product growth. The combination might consist, for example, of a bar of 5052 aluminum alloy submerged with a refractory boat containing a surrounding of an particulate powder or grain, such as mullite/alumina mixture. The combination is heated, for example to 1150° C., and a composite results, containing high purity alumina, aluminum, silicon and other trace metals. The resulting composite is comminuted, leached with acid, elutriated with water, and then leached with alkali and again washed with water to yield a high purity alumina grain or powder.

In a further example, a rectangular ingot of aluminum alloy 5052 (having a nominal composition by weight of 2.4% Mg, and not more than 0.5% Si and Fe) measuring 9×4×1½ inches is placed into a refractory vessel containing a bedding of refractory alumina particles (El Alundum, from Norton Co., 90 mesh) such that one 9×4 inch rectangular face is exposed to the atmosphere. A thin layer of silicon dioxide particles (−140 mesh), a dopant, is dispersed over the exposed surface of the ingot. This setup is placed into a furnace having an orifice through which a continuous supply of air can pass, and heated up to 1125° C. over 10 hours. The furnace is held at 1250° C. for 165 hours, and then cooled down over 10 hours. The resulting ceramic body is recovered and comminuted, by crushing between steel plates, to an appoximate particle size range of −200 mesh. Thus, approximately 250 grams of the comminuted material is placed into a 1-liter beaker containing 500 ml of a 50% HCl solution, a suitable leachant for the nonoxidized aluminum and iron metals. This solution is heated to approximately 85° C. and agitated by stirring for 48 hours. The acid solution is decanted, and the material is rinsed with deionized water. Subsequently, the extraction procedure described above is repeated, but with 500 ml of 50% NaOH, a suitable leachant for the silicon. The material is rinsed thoroughly with deionized water, and the alumina is recovered.

The alumina product of the present invention may be useful in the production of sintered ceramic articles or as polishing media. For such articles, the alumina desirably has a mesh size of about 500 or finer, and more preferably about one micron or less.

What is claimed is:

1. A method for upgrading the quality of an alumina material comprising the steps of:
   (a) positioning an aluminum parent metal adjacent to a permeable mass of an alumina-based filler material, said alumina-based filler material containing at least one aluminothermically reducible constituent, so that formation of an oxidation reaction product of the aluminum parent metal will occur in a direction towards and into said mass of alumina-based filler material;
   (b) heating said parent metal to a temperature range above its melting point but below the melting point of its oxidation reaction product to form a body of molten parent metal and reacting the molten parent metal with an oxygen-containing vapor-phase oxidant at, said temperature to form said oxidation reaction product, and at said temperature maintaining at least a portion of said oxidation reaction product in contact with and extending between said body of molten metal and said oxidant, to draw molten metal through the oxidation reaction product towards the oxidant and towards and into the adjacent mass of said alumina-based filler material so that fresh oxidation reaction product continues to form within said mass of alumina-based filler at an interface between the oxidant and previously formed oxidation reaction product, and continuing said reacting for a time sufficient to embed at least a portion of said mass of alumina-based filler within said oxidation reaction product to produce a ceramic body comprising alumina and at least one residual metallic constituent, whereby said at least one aluminothermically reducible constituent is at least partially reduced and is contained in said at least one residual metallic constituent;

(c) comminuting said ceramic body;

(d) providing at least one leachant capable of dissolving or removing said at least one residual metallic constituent without substantially degrading said alumina in the produced ceramic body and contacting said comminuted ceramic body with said at least one leachant for a time sufficient to remove or dissolve away said at least one residual metallic constituent from said comminuted ceramic body to produce a substantially pure alumina material having a purity of not less than 99.9 weight percent alumina; and (e) recovering said substantially pure alumina material.

2. The method of claim 1, wherein an initiation layer is produced on a surface of said ceramic body in step (b), which layer is the removed prior to step (c).

3. The method of claim 2, wherein said initiation layer comprises a spinel material.

4. The method of any of claim 1, 2 or 3, wherein said oxygen-containing vapor-phase oxidant comprises air.

5. The method of any of claims 1, 2 or 3, wherein a dopant is used in conjunction with said aluminum parent metal.

6. The method of any of claims 1, 2 or 3, wherein said at least one leachant comprises at least one acid material and at least one base material.

7. The method of any of claims 1, 2 or 3, further comprising, after recovery of said substantially pure alumina in step (D), comminuting said recovered alumina a second time to a smaller particle size followed by a subsequent contacting of the twice comminuted alumina with said at least one leachant to further remove or dissolve any said at least one residual metallic constituent, thereby further increasing the purity of the twice comminuted alumina, and recovering the resulting alumina material.

8. The method of any of claims 1, 2 or 3, wherein said at least one acid material comprises an acid selected from the group consisting of HF, HCl, HBr, HI, $H_2SO_4$, $HNO_3$, and $H_3PO_4$.

9. The method of any of claims 1, 2 or 3, wherein said at least one base material comprises a base selected from the group consisting of NaOH, KOH, and $NH_4OH$.

10. An alumina material produced by the method of any of claims 1, 2 or 3, wherein said substantially pure alumina material has substantially impurity-free grain boundaries.

11. An alumina material produced by the method of any of claims 1, 2 or 3, wherein said alumina material exhibits the property of intragranular fracture.

12. The method of claim 1, wherein said at least one leachant comprises at least one acid material.

13. The method of claim 1, wherein said at least one leachant comprises at least one base material.

14. The method of claim 8, wherein said at least one acid material comprises aqua regia.

15. The method of claim 9, wherein said at least one acid material comprises a mixture of $HNO_3$ and HF.

* * * * *

UNITED STATES PATENT AND TRADEMARK OFFICE
CERTIFICATE OF CORRECTION

PATENT NO. : 4,820,498

DATED : April 11, 1989

INVENTOR(S) : Marc S. Newkirk

It is certified that error appears in the above-identified patent and that said Letters Patent is hereby corrected as shown below:

On the cover page under item [73] change "Newak, Del." to --Newark, Del.--.
Column 1, line 52:   change "oixidizing" to --oxidizing--.
Column 5, line 27:   change "aluminun" to --aluminum--;
Column 5, line 66:   delete "par-";
Column 5, line 67:   change "ticule" to --particle--.
Column 8, line 49:   delete "be" (second occurrence).
Column 9, line 34:   change "intitiation" to --initiation--.
Column 10, line 52:  delete the comma after "at".
Column 11, line 20:  change "the" to --then--;
Column 11, line 23:  change "claim" to --claims--.
Column 12, line 1:   change "(D)" to --(e)--;
Column 12, line 5:   after "any" insert --of--;
Column 12, line 10:  change "acid material" to --leachant--;
Column 12, line 14:  change "base material" to --leachant--;
Column 12, line 28:  change "acid material" to --leachant--;
Column 12, line 29:  change "claim 9" to --claim 8--;
Column 12, line 30:  change "acid material" to --leachant--.

Signed and Sealed this

Twenty-fifth Day of December, 1990

Attest:

HARRY F. MANBECK, JR.

Attesting Officer

Commissioner of Patents and Trademarks